May 8, 1956

C. W. SEAL 2,744,618

MULTIPLE CONVEYOR DRIVE

Filed July 16, 1954

INVENTOR.
CLYDE W. SEAL,
BY: Harold B. Hood.
ATTORNEY.

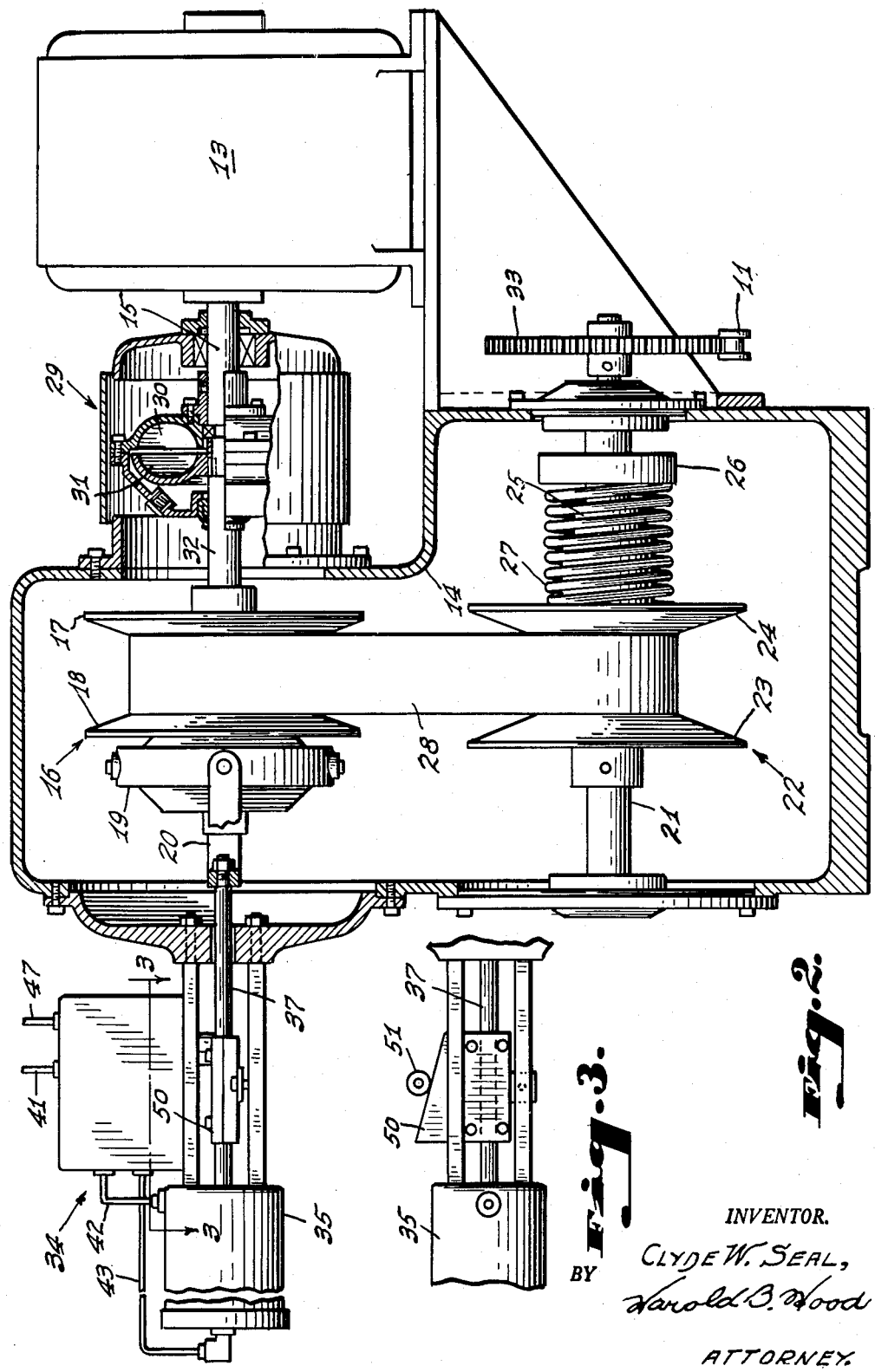

United States Patent Office 2,744,618
Patented May 8, 1956

2,744,618

MULTIPLE CONVEYOR DRIVE

Clyde W. Seal, Columbus, Ind., assignor, by mesne assignments, to Reliance Electric and Engineering Company, Cleveland, Ohio, a corporation of Ohio Application July 16, 1954, Serial No. 443,910

7 Claims. (Cl. 198—203)

The present invention relates to a system for driving an endless conveyor by means of a plurality of individual driving mechanisms arranged at spaced intervals along the conveyor; and particularly to the means for so connecting such mechanisms to the conveyor that each mechanism will pull its proportionate share of the load.

It is well recognized that the limit to the length of a conventional conveyor is controlled by the strength of the conveyor belt or chain. This follows from the fact that the driving force is imposed at only one point along the conveyor and a load impressed on the conveyor remote from that point is moved along by the tension on the conveyor belt or chain. The longer the conveyor, of course, the greater this tension becomes. The primary object of my invention, therefore, is to provide a system in which a conveyor can be driven at a plurality of points along its length, thereby removing the primary limiting factor to conveyor length.

It is necessary in such a system, of course, that the speed of the individual driving mechanisms be maintained in substantial synchronism, and it is a further object of my invention to provide means for so maintaining such synchronism.

Exact synchronism, however, between the driving elements of such a system is impractical from a commercial standpoint. Another object of this invention therefore, is to provide a driving connection between the conveyor and each of the driving mechanisms of such character that each such mechanism will pull a proportionate share of the conveyor load in spite of being slightly out of synchronism with the other driving mechanisms.

Further objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is a longitudinal sectional view drawn to an enlarged scale and showing one of the driving mechanisms used in my system;

Fig. 3 is a fragmentary sectional view taken substantially on line 3—3 of Fig. 2 and showing a detail of the control mechanism thereof.

Figure 1:
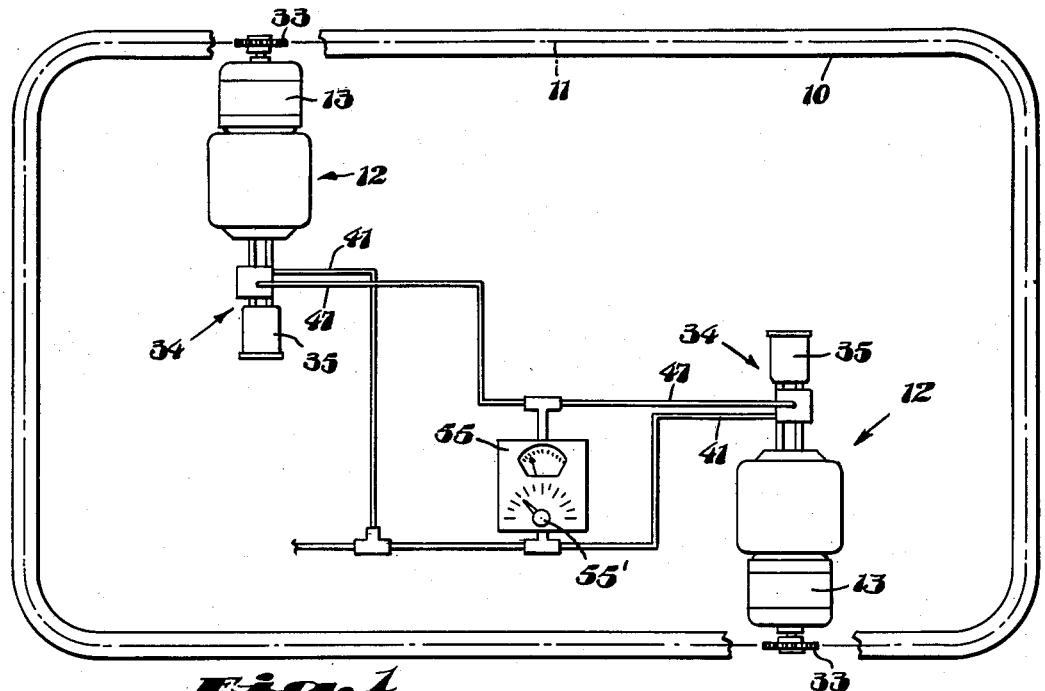
Fig. 1 is a diagrammatic view of a conveyor system showing a multiplicity of driving mechanisms connected thereto, together with the control system for such mechanisms.

Referring more particularly to the drawings, and especially to Fig. 1, it will be seen that I have illustrated, somewhat diagrammatically, an endless conveyor 10 driven through the medium of a chain 11. Spaced at intervals along said conveyor is a plurality of variable speed driving mechanisms referred to generally by the reference numeral 12. Each of such mechanisms comprises a motor 13 supported upon a frame 14, and having a spindle 15 which is connected, through a fluid coupling 29, to drive an expansible V-pulley 16 mounted on the output shaft 32 of said coupling. Such pulley comprises a first coned disc 17 fixed to said shaft 32, and a second, mating coned disc 18 axially movable toward and away from disc 17. A control member 19, for so moving disc 18, is axially fixed relative to disc 18 and includes a yoke 20.

A shaft 21 is journalled in frame 14 substantially parallel to the axis of pulley 16 and supports a second expansible V-pulley 22. Said pulley comprises a first coned disc 23 fixed to shaft 21, and a second, mating coned disc 24 axially movable toward and away from disc 23. Disc 23 is provided with a hub 25 supporting a collar 26 on the outboard end thereof. A coiled spring 27 is confined between collar 26 and disc 24 to urge said disc resiliently toward disc 23. An edge active belt 28 provides a driving connection between pulleys 16 and 22; and shaft 21 carries a sprocket 33 outside the frame 14 and meshing with chain 11.

Since each of the driving mechanisms 12 is drivingly connected to the chain 11, it is necessary that the output speeds of such driving mechanisms be substantially in synchronism with each other. From a commercial standpoint, however, it is impractical to maintain such output speeds in exact synchronism. As is indicated above, the motor of each mechanism 12 drives its variable speed transmission means through a fluid coupling 29, whereby slight differences between the output speeds of such mechanisms are compensated, and each contributes its proportionate share to the driving of the load. Each of such couplings comprises an input or impeller element 30 fixed to the spindle 15 of its motor and an output or runner element 31 fixed to the coupling output shaft 32 which carries the pulley 16. The characteristic of such a fluid coupling is such as to permit the unit 12 to deliver full power to the chain 11 even though there is some slippage between the elements 30 and 31. Thus, although the speeds of the shafts 21 of the several units 12 may vary slightly, each of the mechanisms 12 will pull its proportionate share of the conveyor load.

In order to maintain the output speeds of all of the mechanisms 12 in substantial synchronism, I provide each of such mechanisms with a control means, indicated generally by the reference numeral 34. Each of such control means comprises a fluid motor 35, supported from frame 14, and includes a piston 36 drivingly connected through a rod 37 to the yoke 20. Valve means, indicated generally by the reference numeral 38, is provided for controlling fluid pressure to each of the motor means 35, and is here shown as comprising a cylinder 39 having a spool valve 40 reciprocable therein. A conduit 41 is connected to conduct fluid from a source to the valve means 38, and a conduit 42 is connected to conduct fluid from said valve means to one side of piston 36. A second conduit 43 is connected to conduct fluid from said valve means to the opposite side of piston 36. So long as the valve 40 is in its illustrated position, piston 36 will be held against movement in its cylinder. Movement of the valve upwardly will admit fluid to conduit 43 moving piston 36 to the right. Reverse movement of valve 40 will admit fluid to conduit 42 moving piston 36 to the left. After such movement of valve 40, the return of said valve to its illustrated position will then hold piston 36 in whatever position it then occupies.

To effect such movement of valve 40, I here provide a bellows 44 having a movable wall 45. Valve 40 is operably connected to said wall by means of a rod 46. A conduit 47 is connected to conduit fluid under pressure to the interior of bellows 44.

Figure 4:
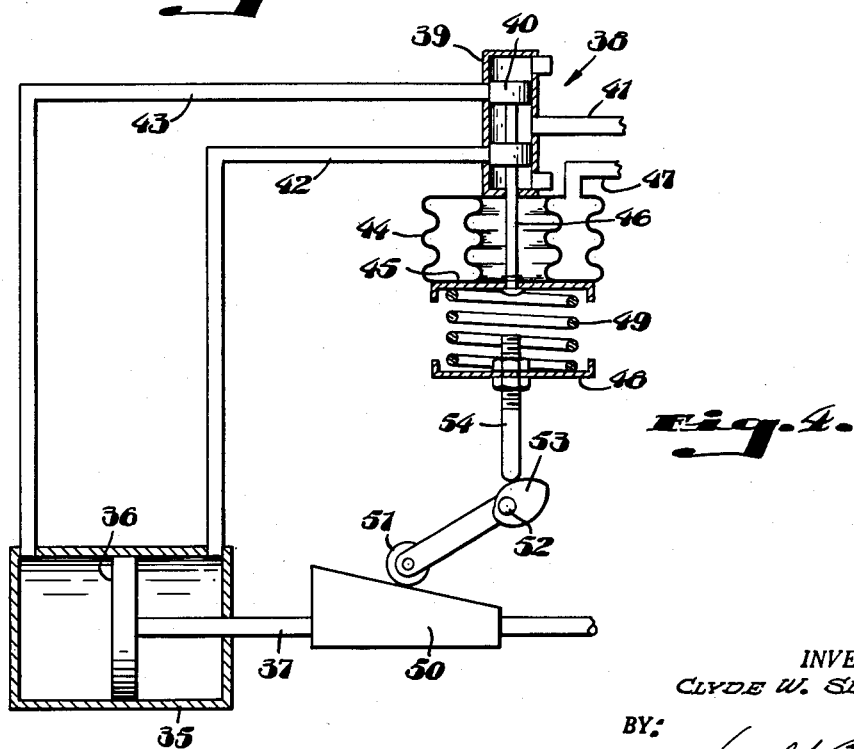
Fig. 4 is a diagrammatic view showing one type of control device used in my system.

As fluid is admitted through conduit 47 to the interior of bellows 44, wall 45 will be forced downwardly, as viewed in Fig. 4. In order to resist such movement of wall 45 I provide a movable abutment 48 spaced from said wall and confine a coiled spring 49 between said abutment and said wall. The compression on spring 49 is such that, at a given pressure within bellows 44, wall 45 will be held in its illustrated position with valve 40 in its neutral position. An increase of such pressure will tend to move wall 45 downwardly shifting valve 40 to admit fluid to conduit 42. A decrease in such pressure will permit spring 49 to move wall 45 upwardly to admit fluid to conduit 43.

A cam 50 is fixed to the rod 37 for movement therewith, and a follower 51 is held resiliently against cam 50 at one end and oscillably supported at the opposite end on shaft 52. A cam 53 is fixed for rotation in response to movement of follower 51 about the axis of said shaft, and a finger 54 is supported from movable abutment 48 and bears against cam 53.

Assuming an increase in fluid pressure within bellows 44, wall 45 will be moved downwardly. Fluid will be admitted through conduit 42 to the right-hand side of piston 36 moving said piston to the left. Follower 51 will be moved in a counter-clockwise direction forcing the finger 54 upwardly to increase the compression of spring 49 to a point where the spring will force wall 45 to return to its illustrated position. Thus, the valve 40 will be returned to its illustrated position and movement of piston 36 will cease. A decrease in pressure in bellows 44 will, of course, permit spring 49 to shift wall 45 upwardly, admitting fluid to conduit 43 to move piston 36 to the right. This will swing follower 51 in a clockwise direction permitting finger 54 to move downwardly thereby decreasing the compression of spring 49 and allowing wall 45 to return to its illustrated position.

By providing a control means 34 for each of the mechanisms 12, and by connecting the conduits 47 to a common source of fluid pressure, all of the mechanisms 12 can be made to react simultaneously to any change of fluid pressure introduced into conduit 47. The output speed of all of the mechanisms 12 will, thereby, be maintained in substantial synchronism and such speeds can be increased or decreased simultaneously.

To provide for changes of fluid pressure within the bellows 44, I connect the conduits 47, from each of the mechanisms 12, to a fluid pressure regulator 55 which serves as a master, speed control. Regulator 55 is provided with a control knob 55' for varying the pressure of the fluid passing through such regulator. The regulator is, of course, connected to a source of fluid under pressure and is of such character that the fluid pressure admitted to the conduits 47 can be varied between such a predetermined low pressure and a predetermined high pressure that the pistons 36 can be moved between the extreme ends of their strokes.

While the control means for the mechanisms 12 are such that the output speeds of the mechanisms will be maintained in substantial synchronism, exact synchronism of such speeds is impractical, as stated above, but such slight variations of speeds as may occur are compensated for by the provision of the fluid couplings 29. A system is therefore provided in which an endless conveyor can be driven from any desired number of points along said conveyor with the assurance that each of the individual driving mechanisms will pull its proportionate share of the conveyor load.

I claim as my invention:

1. In combination with an endless conveyor, a plurality of prime movers arranged at spaced intervals along said conveyor, a speed varying mechanism driven by each prime mover and operatively connected to deliver power to said conveyor, control means for simultaneously increasing or decreasing the output speeds of all of said speed varying mechanisms, a fluid coupling interposed between each of said prime movers and said conveyor, each of said speed varying mechanisms including a control member shiftable to vary the output speed of that mechanism, said control means comprising a fluid motor for each of said mechanisms having a piston drivingly connected to the control member of that mechanism for movement thereof, valve means for each of said motor means oppositely movable to admit fluid under pressure to one side or the other of said piston, pressure-responsive means for each such valve means operably connected to move such valve means in one direction upon a change of fluid pressure therein, means responsive to movement of said piston and operatively connected to move said valve means in the opposite direction, a master pressure-control valve, and conduit means connected to conduct fluid under pressure through said master valve to the pressure-responsive means of each of said valve means.

2. In combination, a plurality of variable speed driving mechanisms adapted for connection to a common load and each including a control member shiftable to vary the output speed of its associated mechanism, and means for maintaining the output speed of such mechanisms in substantial synchronism comprising fluid motor means for each such mechanism including a piston drivingly connected to the control member of that mechanism for movement thereof, valve means for each of such motor means, conduit means adapted to conduct fluid under pressure to each of said motor means through the valve means thereof, pressure-responsive means for each of said valve means connected to open that valve means, upon a change of fluid pressure therein, to admit fluid to said motor means to shift said control member in one direction, means responsive to movement of such control member and connected to close said valve means upon such movement of said control member in said one direction, a master pressure-control valve adapted to be connected to a source of fluid under pressure, and conduit means connected to conduct fluid from said source through said master valve to the pressure-responsive means of each of said valve means.

3. The combination of claim 2 including a separate prime mover for each such mechanism and a fluid coupling interposed between each such prime mover and said load.

4. In combination with an endless conveyor, a plurality of driving means arranged at spaced intervals along said conveyor and each including a prime mover, a variable speed driving mechanism having a control member shiftable to vary the output speed of such mechanism, a fluid coupling having an input element connected to be driven by said prime mover, and an output element drivingly connected to said variable speed mechanism, and means for maintaining the output speeds of such mechanisms in substantial synchronism comprising a fluid motor for each such mechanism including a piston drivingly connected to the control member of that mechanism for movement thereof, valve means for each such motor means operable in one direction to admit fluid to one side of said piston and operable in the opposite direction to admit fluid to the opposite side of said piston, conduit means connected to conduct fluid under pressure to each of such motor means through the valve means thereof, means providing a chamber for each of said valve means including a movable wall, means providing an operative connection between such movable wall and such valve means, a master pressure-control valve, conduit means connected to conduct fluid under pressure through said master valve to the chamber of each of said valve means to urge the movable walls thereof in one direction, a movable abutment spaced from each of said movable walls, spring means confined between such abutment and said movable wall to urge said movable wall in the opposite direction, cam means connected for movement with the piston of each of said motor means, and follower means for each such cam means and operably connected to shift said movable abutment in the direction opposite the direction of movement of said movable wall.

5. In combination, an endless conveyor, a plurality of prime movers arranged at spaced intervals along said conveyor, a speed varying mechanism driven by each prime mover and operatively connected to deliver power to said conveyor, each of said speed varying mechanisms including a member shiftable oppositely to vary oppositely the output speed of that mechanism, a pressure responsive member operatively connected to shift each of said shiftable members, a master pressure control device connected to control all of said pressure responsive members whereby each of said pressure responsive members is subjected to the same degree of pressure and the output speed of each of said speed varying mechanisms will be maintained in substantial synchronism and increased or decreased simultaneously.

6. In combination, an endless conveyor, a plurality of prime movers arranged at spaced intervals along said conveyor, a speed varying mechanism driven by each prime mover and operatively connected to deliver power to said conveyor, each of said speed varying mechanisms including a member shiftable oppositely to vary oppositely the output speed of that mechanism, and speed control means for simultaneously increasing or decreasing the output speeds of all of said speed varying mechanisms, said speed control means comprising an oppositely movable member connected to oppositely shift each of said shiftable members, a master control device, an oppositely movable control element connected to initiate opposite movement of each of said oppositely movable members in response to adjustment of said master control device and means responsive to movement of each of said oppositely movable members to terminate said initiated movement of each of said movable members.

7. The combination as set forth in claim 6 including a fluid coupling operatively interposed between each of said prime movers and said endless conveyor.

References Cited in the file of this patent

UNITED STATES PATENTS

| 2,393,563 | Petterson | Jan. 22, 1946 |
| 2,625,257 | Schenk | Jan. 13, 1953 |